United States Patent Office 3,040,695
Patented June 26, 1962

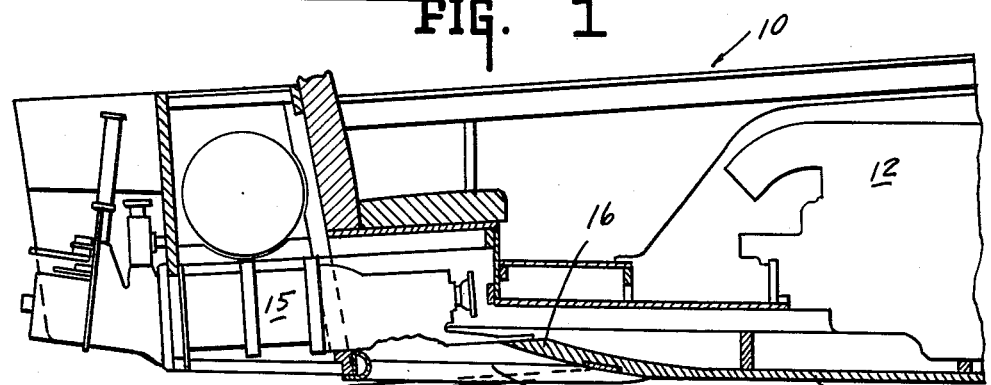
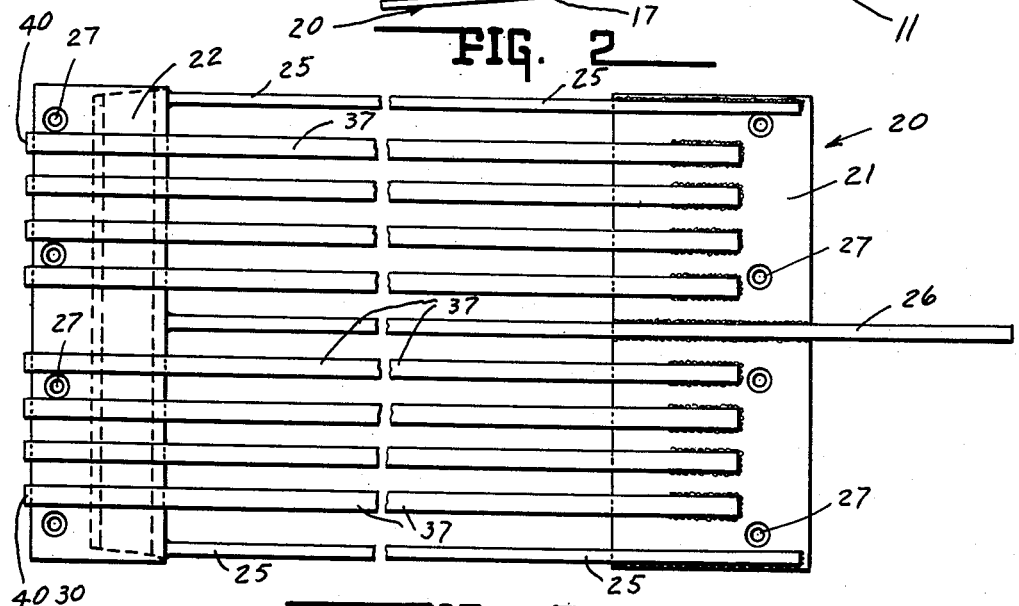
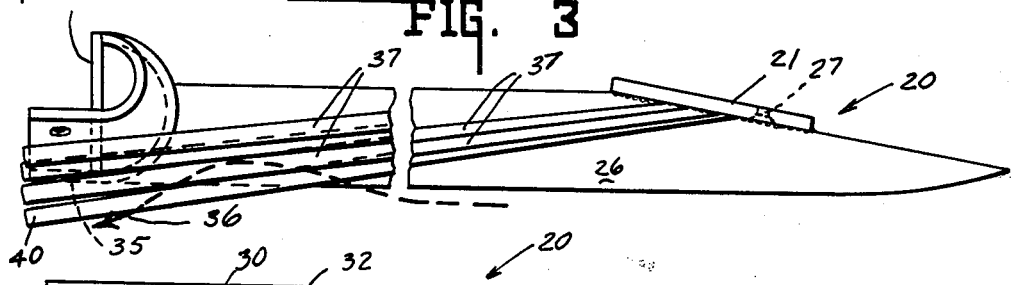
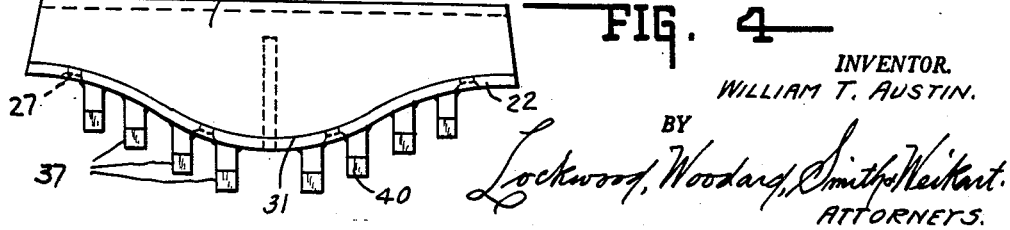

3,040,695
INTAKE STRAINER
William T. Austin, Indianapolis, Ind., assignor to The Buehler Corporation, a corporation of Indiana
Filed Feb. 16, 1960, Ser. No. 9,072
6 Claims. (Cl. 115—14)

The present invention relates to an intake strainer which finds a primary utility as a strainer or guard for the water intake opening of a water jet propelled boat.

One type of jet propelled boat is provided with an engine driven turbine which pumps water through a conduit passing through the boat. Water is drawn into the conduit through an intake opening at the bottom of the boat, is pumped through the conduit by the turbine and is exhausted in a stream from the rear of the boat, the stream leaving the boat above the water within which the boat is floating or is supported.

One problem present in the construction and operation of such water jet propelled boats is that of preventing debris and other matter in the water from entering the intake opening interfering with the operation of and causing damage to the turbine and/or other operating components of the boat. This problem is reduced in one type of jet propelled boat by the fact that the intake opening is located in the bottom of the boat and is arranged in parallel relation to the bottom of the boat. Thus, as the boat moves through or on the water, the intake opening is in generally parallel relation to the relative movement of the water and the boat and, in one manner of speaking, the flow of water adjacent the bottom of the boat is generally parallel to the intake opening.

Of course, a certain proportion of the water adjacent the bottom of the boat will flow somewhat upwardly into the intake opening to be acted upon by the turbine. It can be seen, however, that relatively heavy objects in the water will tend to bypass the intake opening rather than to be drawn upwardly into that opening. Many objects however, such as seaweed and the like will tend to move into the intake opening which, as mentioned, can cause trouble. It is, therefore, one object of the present invention to provide an improved strainer for the intake opening of a water jet propelled boat.

A further object of the invention is to provide means for repeatedly striking the rearward edge portion of the intake opening of a jet boat for shaking loose and removing debris and other matter thereon.

Still another object of the present invention is to provide an improved strainer for the intake opening of a water jet propelled boat, the strainer incorporating self cleaning means.

A further object of the present invention is to provide an improved liquid jet propelled boat.

Another object of the invention is to provide an improved strainer for an intake opening.

Other objects will in part be obvious and in part appear as the description proceeds.

In accordance with the present invention, there is provided a liquid jet propelled boat including a hull and a conduit extending through the hull and having an intake opening in the bottom thereof. The boat is provided with means for moving water into the intake opening through the conduit and out the rear of the boat for propelling the boat. A plurality of spaced elongated bars are mounted on the upstream side of the intake opening and extend from their mountings in free, unsupported relation and in a downstream direction so as to cover the opening, the bars being located below the intake opening and being formed of sufficiently elastic material to cause the free end portions of the bars to vibrate as a result of the liquid flow along the bottom of the boat and to strike the downstream edge portion of the intake opening.

The full nature of the invention will be understood from the accompanying drawings and the following description and claims.

FIG. 1 is a longitudinal vertical section of a jet propelled boat embodying the present invention.

FIG. 2 is a bottom plan view of an intake strainer forming a part of the jet boat of FIG. 1 and embodying the present invention.

FIG. 3 is a side elevation of the intake strainer of Fig. 2 with certain portions removed in order to clearly illustrate the invention.

FIG. 4 is a rear view of the intake strainer.

Referring now the the drawings, there is illustrated a jet propelled boat 10 having a hull 11 and an engine 12 mounted within the hull. The engine is arranged to drive a turbine 15 which is mounted within a conduit 16 having an intake opening 17 at the bottom of the boat and extending through the boat so as to open through the rear of the boat. In operation, water is pumped by means of the turbine 15 through the intake opening 17 into the conduit 16 and out the rear of the boat causing the boat to move.

Fixedly mounted at the intake opening 17 is an intake strainer indicated generally by the numeral 20 and illustrated in detail in FIGS. 2–4. The intake strainer comprises a forward plate 21 and a curved rearward plate 22 which are fixed in spaced relation by means of elongated members or bars 25 and 26, the bars 25 and 26 being fixed at their rearward ends to the rearward plate 22 and the bars 25 being fixed at their forward ends to the plate 21. It should be noted that the most central member 26 extends forwardly past the forward plate 21 and is fixed to that plate adjacent its forward end. The intake strainer 20 is fixed to the boat at the intake opening by means of suitable bolts or screws extending through a plurality of spaced bores 27 located in the forward and rearward plates 21 and 22.

A vertically and laterally extending flat plate 30 has an arcuate lower edge 31 and is fixed at its upper edge portion 32 and at its lower edge portion 31 to the curved rearward plate 22. The arcuate shape of the lower edge 31 is reproduced in the rearwardly extending portion 35 of the rearward curved plate 22 and corresponds to the shape of the bottom of the hull of the boat. Thus, when the intake strainer is mounted on the boat as illustrated in FIG. 1, the rearwardly extending portion 35 of the rearward plate is flush with the bottom of the boat. It can be seen that the rearward plate 22 defines the downstream edge portion of the intake opening 17 and provides a convex shape which is part circular in cross section and has an axis which extends perpendicularly to the direction of the flow of water along the bottom of the boat.

This convex shape of the rearward plate 22 causes a portion of the water flowing along the bottom of the boat to move as indicated by the arrow 36 in FIG. 3, that is to move into the intake opening and out again. This flow pattern produced by the convex shape of the plate 22 cooperates with the structure described below to prevent debris from entering the conduit 16 so as to cause damage or to interfere with the operation of the boat. A plurality of elongated bars or rods 37 are fixed at their forward ends to the plate 21 and extend in free, unsupported relation in a downstream direction below and covering the intake opening 17. The rearward end portions 40 of the bars 37 extend below and are spaced from the rearward curved plate 22. The rods 37 are so proportioned and are formed of resilient material which is sufficiently elastic to cause the free end portions 40 of the bars to vibrate as a result of the water flow and to strike the curved plate 22.

As the boat moves, the water flows along the bottom of the boat and a certain portion of the water moves upwardly into the conduit 16. The elongated rods 37 strain debris and seaweed from the water, the debris collecting on the bars and moving rearwardly thereof with the water flow. As mentioned above, a certain proportion of the water moves as indicated by the arrow 36 causing the debris to be washed rearwardly of the rods and to pass off of the free end portions thereof whereby the rods are maintained in a clean condition. The water flow also causes the rods to vibrate and to strike the rearward plate 22, the jarring action resulting from such striking aiding the flow of water in washing the debris from the bars and also jarring loose debris which tends to collect on the rearward plate 22.

From the above description, it can be seen that the present invention provides an improved strainer for the intake opening of a water jet propelled boat. It can also be seen that the present invention provides an intake strainer incorporating automatic means for repeatedly striking the rearward edge portion of an intake opening for jarring loose and removing debris from the intake strainer. It should be understood that the intake strainer of the present invention may find applications other than in a jet boat.

In the present specification and claims, liquid or water is referred to as flowing along the hull into the intake opening and conduit. It should be understood that the intended meaning of such terminology is relative movement between the liquid and structure. For example, as a jet boat moves in the water, it is conceivable that the water outside the hull would not move at all when the earth is used as the frame of reference. However, if the boat is used as the frame of reference, the liquid is flowing along the hull and into the intake opening.

While the invention has been disclosed and described in some detail in the drawings and foregoing description, they are to be considered as illustrative and not restrictive in character, as modifications may readily suggest themselves to persons skilled in this art and within the broad scope of the invention, reference being had to the appended claims.

The invention claimed is:

1. A liquid jet propelled boat comprising a hull, a conduit extending through said hull and having an intake opening in the hull at a location where the liquid supporting the hull flows along the hull during movement of the boat, a plurality of spaced elongated bars mounted upstream of said opening and extending from their mountings in free unsupported relation in a downstream direction over said opening, said free end portions being located outwardly of said intake opening, said bars being sufficiently elastic to cause the free end portions of said bars to vibrate as a result of the liquid flow and to strike the downstream edge portion of said intake opening.

2. A liquid jet propelled boat comprising a hull, a conduit extending through said hull and having an intake opening in the hull at a location where the hull supporting liquid flows along the hull during movement of the boat, a plurality of spaced elongated bars mounted upstream of said opening and extending from their mountings in free unsupported relation in a downstream direction over said opening, said bars being located outwardly of said intake opening, said bars being sufficiently elastic to cause the free end portions of said bars to vibrate as a result of the liquid flow and to strike the downstream edge portion of said intake opening, said downstream edge portion being convex in cross section.

3. A strainer for an intake opening in a surface having liquid flowing therealong in contact therewith which comprises, a plurality of spaced elongated bars fixedly mounted upstream of said opening and extending from their mountings in free unsupported relation in a downstream direction over said opening, said bars being located outwardly of said intake opening, said bars being formed of sufficiently elastic material to cause the free end portions of said bars to vibrate as a result of the liquid flow and to repeatedly strike the downstream edge portion of said intake opening, said downstream edge portion having a convex shape part-circular in cross section and having an axis which extends perpendicularly to the direction of flow.

4. A liquid jet propelled boat comprising a hull, a conduit extending through said hull and having an intake opening in the bottom of the hull at a location where the hull supporting liquid flows along the hull during movement of the boat, means mounted on said boat for moving water through said conduit, a plurality of spaced elongated bars mounted upstream of said opening and extending from their mountings in free unsupported relation in a downstream direction covering said opening, said bars being located below said intake opening, said bars being sufficiently elastic to cause the free end portions of said bars to vibrate as a result of the liquid flow and to strike the downstream edge portion of said intake opening, said downstream edge portion being convex in cross section.

5. In a jet boat an intake arrangement comprising a downwardly facing intake opening arranged generally parallel to liquid flow, a downstream edge portion of said opening being outwardly bowed and extending below said opening forward edge, a plurality of spaced elongated bars mounted upstream of said opening and having free end portions extending downstream in covering relation to said intake opening, said free end portions being located outwardly of said opening downstream edge portion whereby a portion of the liquid entering said intake opening initially passes through said elongated bars and subsequently is deflected away from said opening and again through said elongated bars by said convex downstream edge portion to effectively wash said elongated bars of debris.

6. A liquid jet propelled boat comprising a hull, a conduit extending through said hull and having an intake opening in the hull at a location where the liquid supporting the hull flows along the hull during movement of the boat, a plurality of spaced elongated bars mounted upstream of said opening and extending from their mountings in free unsupported relation in a downstream direction over said opening, said elongated bars having their upstream ends secured to a frame comprising forward and rearward plates that are interconnected by bars affixed to both of said plates, said plates being formed to conform to said hull, said free end portions being located outwardly of said intake opening, said bars being sufficiently elastic to cause the free end portions of said bars to vibrate as a result of the liquid flow and to strike the downstream edge portion of said intake opening.

References Cited in the file of this patent
UNITED STATES PATENTS

| | | |
|---|---|---|
| 2,117,495 | Norquist | May 17, 1938 |
| 2,303,437 | Cordova | Dec. 1, 1942 |